United States Patent [19]
Faigle et al.

[11] Patent Number: 5,655,790
[45] Date of Patent: Aug. 12, 1997

[54] AIR BAG INFLATOR

[75] Inventors: Ernst M. Faigle, Dryden; Tracy S. Sparks, Lapeer; Richard J. Thompson, Imlay City, all of Mich.

[73] Assignee: TRW Vehicle Safety Systems Inc., Lyndhurst, Ohio

[21] Appl. No.: 471,406

[22] Filed: Jun. 6, 1995

[51] Int. Cl.⁶ .................................................. B60R 21/26
[52] U.S. Cl. ........................ 280/737; 280/741; 222/3
[58] Field of Search .......................... 280/736, 737, 280/741; 102/530, 531, 202, 202.14; 222/3, 5; 422/164, 167

[56] References Cited

U.S. PATENT DOCUMENTS

| | | | |
|---|---|---|---|
| 4,200,613 | 4/1980 | Hamilton et al. | 422/166 |
| 4,358,998 | 11/1982 | Schneiter et al. | 102/530 |
| 5,033,772 | 7/1991 | Frantom et al. | 280/737 |
| 5,060,973 | 10/1991 | Giovanetti | 280/736 |
| 5,230,532 | 7/1993 | Blumenthal et al. | 280/741 |
| 5,344,186 | 9/1994 | Bergerson et al. | 280/741 |
| 5,348,344 | 9/1994 | Blumenthal et al. | 280/737 |
| 5,351,619 | 10/1994 | Chan et al. | 102/289 |
| 5,411,290 | 5/1995 | Chan et al. | 280/737 |

FOREIGN PATENT DOCUMENTS

2264772  9/1993  United Kingdom.

*Primary Examiner*—Christopher P. Ellis
*Attorney, Agent, or Firm*—Tarolli, Sundheim, Covell, Tummino & Szabo

[57] ABSTRACT

An air bag inflator (10) includes inflation fluid stored in a chamber (18). The inflator (10) includes a combustible sheet member (100) which comprises an oxidizable substrate, such as a polytetrafluoroethylene film, and a layer of a fuel material, such as magnesium, on the substrate. The combustible sheet member (100) is disposed in a perforated tube (90) in the chamber (18). The combustible sheet member (100), when ignited by an igniter (70), emits combustion products through openings (98) in the perforated tube (90) to warm and increase the pressure of the inflation fluid in the chamber (18). The inflation fluid includes 5% to 20% oxygen to support the combustion of the combustible sheet member (100).

16 Claims, 5 Drawing Sheets

AIR BAG INFLATOR

BACKGROUND OF THE INVENTION

1. Technical Field

The present invention relates to an apparatus for inflating an inflatable vehicle occupant restraint such as an air bag and, in particular, relates to an air bag inflator having stored gas for inflating an air bag.

2. Description of the Prior Art

It is known to inflate an inflatable vehicle occupant restraint, such as an air bag, to restrain or protect a vehicle occupant. The air bag is inflated with inflation fluid from an inflator.

Some air bag inflators contain a stored quantity of pressurized inflation fluid, or a combination of pressurized inflation fluid and ignitable material for heating the inflation fluid. In the event of a vehicle emergency situation which requires deployment of the air bag, the inflation fluid in the container is released to inflate the air bag to help protect the vehicle occupant.

If the inflator is of the type which includes an ignitable material for heating the inflation fluid, the ignitable material is ignited and forms hot combustion products which heat the stored inflation fluid. The heated inflation fluid flows into the air bag.

SUMMARY OF THE INVENTION

The present invention in a first embodiment is an apparatus for inflating an inflatable vehicle occupant restraint. The apparatus includes a container having a chamber. A quantity of inflation fluid is stored in the chamber. The apparatus includes combustible means for warming and increasing the pressure of the stored inflation fluid. The combustible means includes a combustible sheet member disposed in the chamber. The combustible sheet member comprises a substrate of oxidizing film having a layer of fuel material on at least a portion of one surface of the film. The substrate and the fuel material are capable of reacting together exothermically on ignition. The inflation fluid comprises oxygen for supporting the combustion of the combustible sheet member. The apparatus further includes igniter means for igniting the combustible sheet member, and directing means for directing the inflation fluid from the container to the inflatable restraint.

In another embodiment of the invention, similar to the first embodiment, a second combustible sheet member is disposed in the chamber. The apparatus includes first igniter means for selectively igniting the first combustible sheet member independently of the second combustible sheet member, and second igniter means for selectively igniting the second combustible sheet member independently of the first combustible sheet member.

In a further embodiment of the invention, an apparatus for inflating an inflatable vehicle occupant restraint includes a container having a storage chamber and a quantity of inflation fluid stored in the storage chamber. The stored inflation fluid comprises a combustible fuel gas. The apparatus includes means for defining an opening for enabling the inflation fluid to flow in a first direction through the opening from the storage chamber. A rupturable member closes the opening. The apparatus includes first igniter means for rupturing the rupturable member and for igniting the combustible fuel gas. The first igniter means includes supporting means for supporting an ignitable material which produces combustion products to ignite the combustible fuel gas and moving means for moving the supporting means against the rupturable member to rupture the rupturable member. The apparatus further includes combustible means for warming and increasing the pressure of inflation fluid in the storage chamber. The combustible means includes a combustible sheet member disposed in the storage chamber. The combustible sheet member comprises a substrate of oxidizing film having a layer of fuel material on at least a portion of one surface of the film. The substrate and the fuel material are capable of reacting together exothermically on ignition. The apparatus includes second igniter means for igniting the combustible sheet member.

In another embodiment the invention is an apparatus for inflating an inflatable vehicle occupant restraint. The apparatus comprises a container having a storage chamber. A quantity of inflation fluid is stored in the storage chamber. The stored inflation fluid comprises a combustible fuel gas. The apparatus includes means for defining a combustion chamber adjacent to the storage chamber, and means for defining an inflation fluid flow opening intermediate the storage chamber and the combustion chamber for enabling the inflation fluid from the storage chamber to flow in a first direction through the inflation fluid flow opening into the combustion chamber. A member closes the inflation fluid flow opening. Directing means directs the inflation fluid from the combustion chamber to the inflatable restraint upon rupturing of the member. The apparatus also includes combustible means for igniting the fuel gas in the combustion chamber. The combustible means includes a combustible sheet member comprising a substrate of oxidizing film having a layer of fuel material on at least a portion of one surface of the film, the substrate and the fuel material being capable of reacting together exothermically on ignition. The apparatus further includes igniter means for igniting the combustible sheet member, and a combustion arrestor disposed in the storage chamber adjacent the opening for blocking flow of combustion products from the combustion chamber in a second direction opposite to the first direction through the opening.

In yet another embodiment of the invention, an apparatus for inflating an inflatable vehicle occupant restraint includes a member closing an opening in a storage chamber in a container. The member is rupturable to release inflation fluid from the container. The member has a first condition in which the member has a first burst strength and resists rupturing from the pressure of the inflation fluid stored in the storage chamber. The member has a second condition in which the member has a second burst strength which is less than the first burst strength. The member, when in the second condition, ruptures from the pressure of the inflation fluid stored in the storage chamber. A heating means for heating the member to change the member from the first condition to the second condition, to cause rupturing of the member, includes a combustible sheet member comprising a substrate of oxidizing film having a layer of fuel on at least a portion of one surface of the film. The substrate and the fuel are capable of reacting together exothermically on ignition.

BRIEF DESCRIPTION OF THE DRAWINGS

The foregoing and other features of the present invention will become apparent to those skilled in the art to which the present invention relates from reading the following specification with reference to the accompanying drawings, in which.

DESCRIPTION OF PREFERRED EMBODIMENTS

The present invention relates to an apparatus for inflating an inflatable vehicle occupant restraint and, in particular, relates to an air bag inflator which uses stored inflation fluid to inflate an air bag. The present invention is applicable to air bag inflators of various constructions.

First Embodiment

Figure 1:
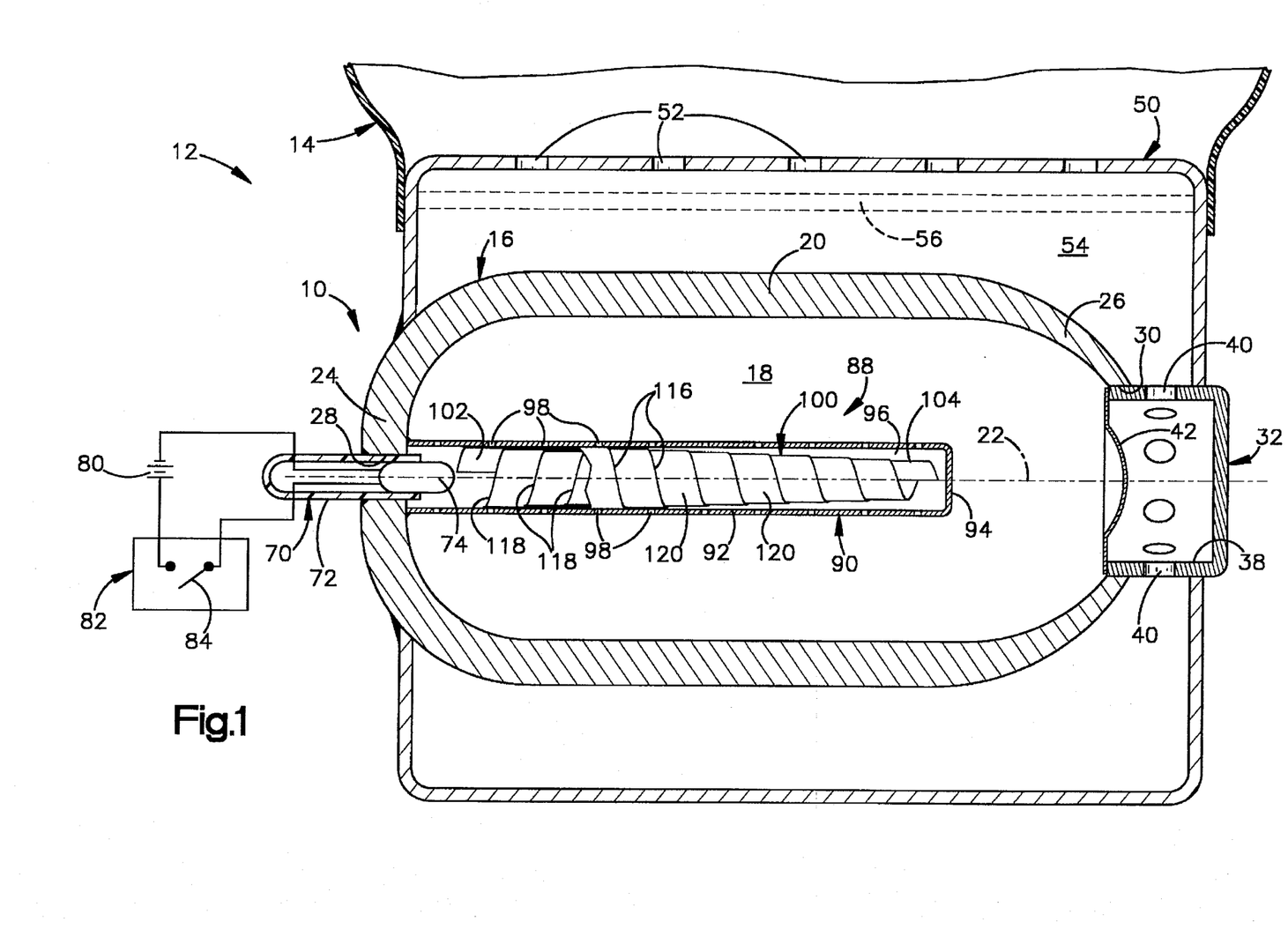
FIG. 1 is a schematic illustration partially in section of a vehicle safety apparatus including an air bag inflator which is constructed in accordance with a first and a second embodiment of the present invention.

As representative of the present invention, FIG. 1 illustrates an air bag inflator 10 which is constructed in accordance with a first embodiment of the present invention. The inflator 10 forms a part of a vehicle occupant safety apparatus 12. The safety apparatus 12 includes a particular inflatable vehicle occupant restraint 14, commonly referred to as an air bag, which is inflated by the inflator 10, in a manner described below, in the event of a vehicle emergency situation which requires deployment of an air bag. The air bag 14, when inflated, restrains movement of a vehicle occupant and helps to protect the vehicle occupant from forcibly striking parts of the vehicle in which the safety apparatus 12 is mounted.

The inflator 10 includes a container 16. The container 16 defines a sealed storage chamber 18 containing a quantity of inflation fluid stored under pressure. The inflation fluid in the chamber 18 includes an inert gas, such as argon or nitrogen. The inflation fluid also includes preferably from about 5% to about 20% oxygen by volume.

The container 16 has a cylindrical side wall portion 20 which extends parallel to an axis 22 of the inflator 10. The container 16 also includes a substantially hemispherical first end wall portion 24 and a substantially hemispherical second end wall portion 26. An annular surface 28 centered on the axis 22 defines an opening in the first end wall portion 24. An annular surface 30 centered on the axis 22 defines an opening in the second end wall portion 26.

An outlet manifold 32 is secured in the opening in the second end wall portion 26 of the container 16. A side wall 38 of the outlet manifold 32 has a circumferential array of inflation fluid flow openings 40. A burst disk 42 on the outlet manifold 32 blocks the flow of inflation fluid from the chamber 18 to the inflation fluid flow openings 40. The burst disk 42 is rupturable upon the application of a predetermined level of pressure on the side of the burst disk 42 facing the first end wall portion 24 of the container 16.

The safety apparatus 12 further includes an optional diffuser 50 having a plurality of inflation fluid outlet openings 52. The diffuser 50 surrounds the container 16 and the outlet manifold 32. The diffuser 50 defines a plenum 54 for directing inflation fluid to flow from the inflation fluid flow openings 40 in the outlet manifold 32 to the inflation fluid outlet openings 52 in the diffuser 50. The diffuser 50 may contain a known filter element indicated schematically at 56 for filtering particulate material from inflation fluid flowing through the plenum 54.

The inflator 10 includes an igniter 70. The igniter 70 includes a housing 72 which is secured in the passage 28 in the first end wall portion 24 of the container 16. The housing 72 supports a known squib 74 containing pyrotechnic material. The squib 74 emits products of combustion of the pyrotechnic material when electrically actuated. The squib 74 is electrically connected with vehicle electric circuitry including a power source 80, such as the vehicle battery, and a vehicle deceleration sensor 82 including a normally open switch 84.

The inflator 10 further includes a heating assembly 88. The heating assembly 88 includes a perforated steel tube 90 which, as illustrated, is connected with the first end wall portion 24 of the container 16 in any suitable manner. The perforated tube 90 is disposed inside the storage chamber 18 in the container 16. The perforated tube 90 extends axially from the first end wall portion 24 of the container 16 in a direction toward the second end wall portion 26 of the container.

The perforated tube 90 includes an axially extending, cylindrical side wall 92 and a radially extending end wall 94. The side wall 92 and the end wall 94 of the perforated tube 90 define a combustion chamber 96 inside the perforated tube. A plurality of perforations or openings 98 in the side wall 92 of the perforated tube 90 establish fluid communication between the combustion chamber 96 inside the perforated tube and the portion of the storage chamber 18 which is disposed outside the perforated tube.

A combustible sheet member 100 is disposed inside the combustion chamber 96 in the perforated tube 90. The combustible sheet member 100 is a single sheet of combustible material which is available under the trademark ENER-FOIL from ICI Automotive Products of Valley Forge, Pa., a business unit of ICI Americas Inc. The combustible sheet member 100 comprises a substrate of oxidizing film having a layer of oxidizable material (fuel) on at least a portion and preferably all of one major side surface of the film. The substrate and the fuel material are capable of reacting together exothermically on ignition. In a preferred embodiment, the substrate is polytetrafluoroethylene film and the fuel material is magnesium.

The combustible sheet member 100 comprises an elongate strip of sheet material which has an inner major side surface 112 (FIGS. 2 and 3) and an outer major side surface 114. The strip of sheet material also has a first or outer edge surface 116, and a second or inner edge surface 118. The edge surfaces 116 and 118 extend along the entire length of the elongate strip of sheet material which forms the combustible sheet member 100.

Figure 2:
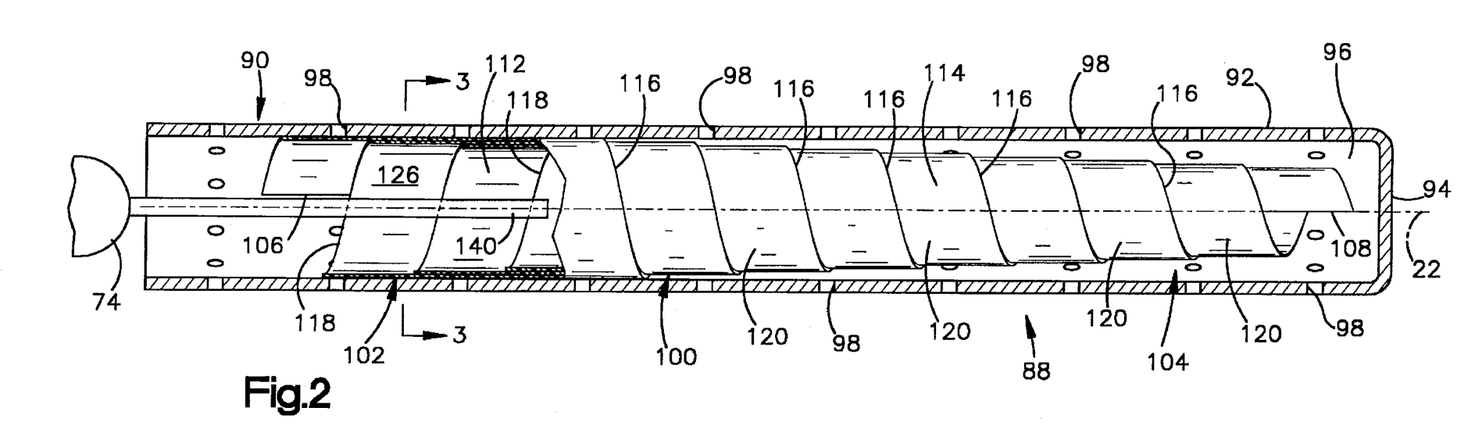
FIG. 2 is an enlarged view of a portion of FIG. 1.
Figure 3:
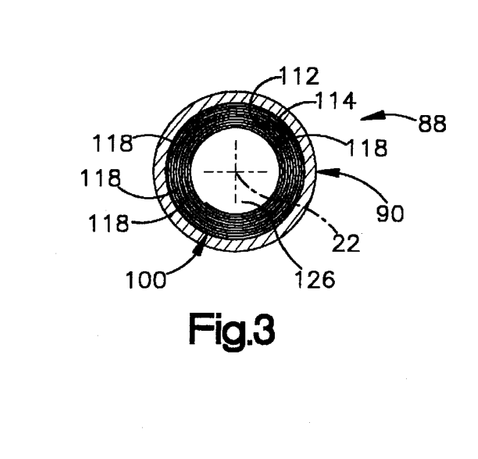
FIG. 3 is a view partially in section taken generally along line 3—3 of FIG. 2.

A first end portion 102 of the combustible sheet member 100 is disposed adjacent to the squib 74. The first end portion 102 includes a first end edge 106 of the elongate strip of sheet material which forms the combustible sheet member 100. A second end portion 104 of the combustible sheet member 100 is disposed adjacent to the end wall 94 of the perforated tube 90. The second end portion 104 includes a second end edge 108 of the elongate strip of sheet material which forms the combustible sheet member 100.

The combustible sheet member 100 is rolled up in a funnel shape inside the perforated tube 90. The combustible sheet member 100 includes a series of turns or wraps 120 which are spaced along the axis 22. The funnel-shaped or conical configuration of the combustible sheet member 100 results from the layering effect of the multiple wraps 120 of sheet material. That is, as the series of wraps 120 proceeds from the second end portion 104 to the first end portion 102, each succeeding wrap is layered on the outer surface of the prior wrap. Thus, each succeeding layer or wrap 120 has a larger diameter than the one next closer to the second end portion 104. The combustible sheet member 100 thus has a conical configuration with a larger diameter at the first end portion 102 of the combustible sheet member 100 and a smaller diameter at the second end portion 104.

The series of wraps 120 of the combustible sheet member 100 define a central passage 126 in the combustible sheet member 100. The passage 126 has a generally conical configuration with a larger diameter at the first end portion 102 of the combustible sheet member 100 and a smaller diameter at the second end portion 104. The second edge surface 118 of the combustible sheet member 100 extends along the outer periphery of the central passage 126 from the second end portion 104 to the first end portion 102. The second edge surface 118 is therefore presented toward the squib 74 and is exposed to the squib. The first edge surface 116 of the combustible sheet member 100 extends along the outside of the conical configuration of the combustible sheet member and is presented toward the end wall 94 of the perforated tube 90.

When the vehicle in which the safety apparatus 12 is mounted experiences a vehicle emergency situation, such as a collision, that requires inflation of the air bag 14 to protect a vehicle occupant, the switch 84 in the deceleration sensor 82 closes. Electric current then flows from the power source 80 through the igniter 70 to actuate the pyrotechnic squib 74. The hot products of combustion of the squib 74 flow axially along the length of the perforated tube 90 from the first end portion 102 of the combustible sheet member 100 in a direction toward the second end portion 104 of the combustible sheet member.

The hot products of combustion of the squib 74 flow primarily along the central passage 126 in the combustible sheet member 100. The hot products of combustion of the squib 74 thus engage the exposed second edge surface 118 of the combustible sheet member 100 and ignite the combustible sheet member along the second edge surface. Ignition of the combustible sheet member 100 also occurs at the first edge surface 116. Combustion of the combustible sheet member 100 then proceeds along the remaining portions of the combustible sheet member from the portions ignited by the squib 74.

As the combustible sheet member 100 burns, it emits additional hot combustion products. The hot combustion products of the combustible sheet member 100 flow radially outward through the openings 98 in the side wall 92 of the perforated tube 90 into the remaining portions of the storage chamber 18. The combustion products of the combustible sheet member 100 heat the inflation fluid stored in the storage chamber 18 in the container 16. The inflation fluid in the storage chamber 18 is thus warmed and increased in pressure as combustion of the combustible sheet member 100 proceeds. The combustible sheet member 100 may not be fully oxidized in the combustion chamber 96 in the perforated tube 90. In this case, the hot products of combustion of the combustible sheet member 100 flow out of the perforated tube 90 and are further oxidized by reacting with the oxygen in the inflation fluid in the chamber 18.

When the rising pressure in the storage chamber 18 reaches a predetermined pressure, the burst disk 42 ruptures. The warm compressed inflation fluid flows rapidly and forcefully from the storage chamber 18 past the ruptured burst disk 42 to the inflation fluid flow openings 40. The flow of pressurized inflation fluid continues from the inflation fluid flow openings 40 through the plenum 54, the filter element 56 and the inflation fluid outlet openings 52 to the air bag 12 to inflate the air bag.

The combustible sheet member 100 burns only at locations where there are present both an oxidizing material (such as the fluorine in the polytetrafluoroethylene substrate) and a fuel (such as the magnesium outer layer). Both the substrate portion and the fuel portion of the combustible sheet member 100 are present and are exposed at the second edge surface 118. Because of the funnel shape of the combustible sheet member 100, substantially the entire second edge surface 118 is presented toward and exposed to the squib 74 along the length of the combustible sheet member. Thus, the combustible sheet member 100 ignites rapidly along its entire length because of its funnel-shaped configuration. This can help to pressurize the inflation fluid in the storage chamber 18 more rapidly than occurs by burning a combustible sheet member from one end only, such as occurs with the cylindrical rolled configuration illustrated in FIG. 6, for example.

The funnel-shaped configuration of the combustible sheet member 100 does not present a large amount of surface area of the edge surfaces 116 and 118 at a location close to the igniter 70. This can be advantageous because the igniter 70, when actuated, emits a shock wave in addition to combustion products. The shock wave travels axially toward the end wall of the perforated tube 90. A combustible sheet member which has a large edge surface area extending perpendicular to the path of travel of the shock wave, adjacent to the igniter 70, is more susceptible to damage from the impact of the shock wave on the edge surface. Any such damage may adversely affect the ignition of the combustible sheet member. The impact from the shock wave is minimized with the funnel-shaped configuration of the combustible sheet member shown in FIGS. 1–3 because the edge surfaces 116 and 118 both extend along substantially the entire length of the combustible sheet member 100.

Figure 4:
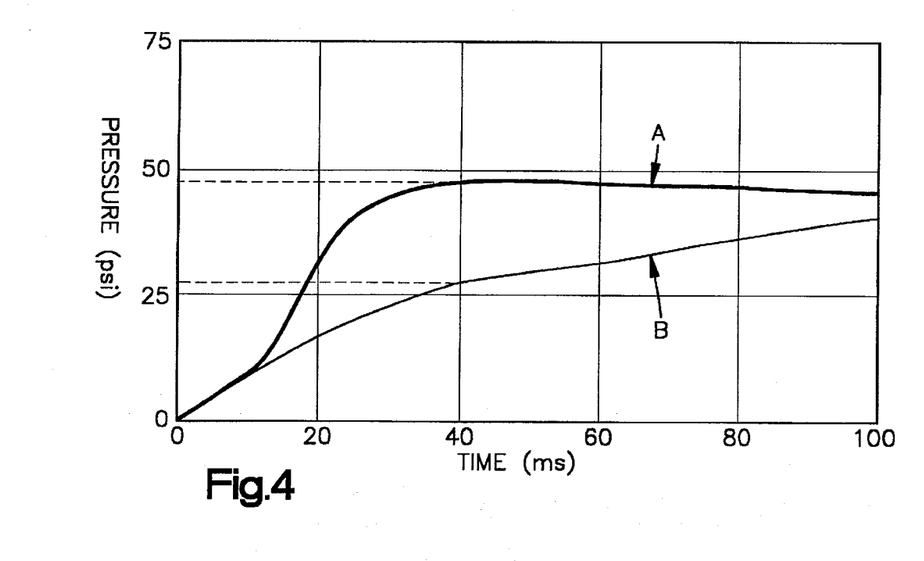
FIG. 4 is a graph which plots ballistic test chamber pressure against time upon actuation of inflators which are constructed in accordance with the first embodiment and the second embodiment of the present invention.

FIG. 4 illustrates graphically the effect of the presence of the oxygen in the inflation fluid in an inflator. The partially oxidized products of combustion of the combustible sheet member may complete the oxidation reaction in the chamber of the inflator by reacting with the oxygen in the inflation fluid. The curve marked "A" in FIG. 4 represents the pressure, plotted against time, of an inflation fluid in a ballistic test chamber (not shown) for an inflator. The inflation fluid in the inflator contains about 15% oxygen and about 85% argon. Time 0 represents the time of ignition of 2.5 grams of a combustible sheet member such as the combustible sheet member 100. The ignition of the combustible sheet member results in heating and pressurization of the inflation fluid in the inflator. At about 40 milliseconds after ignition, the pressure of the inflation fluid in the ballistic test chamber has risen to about 49 psi. The pressure in the ballistic test chamber peaks at a time between about 40 milliseconds after ignition and about 60 milliseconds after ignition.

The curve marked "B" in FIG. 4 represents the ballistic test chamber pressure, plotted against time, of a different inflation fluid in the same inflator. The inflation fluid represented by the curve marked "B" contains only argon and no oxygen. Time 0 represents the time of ignition of 6 grams of a combustible sheet member such as the combustible sheet member 100. The inflation fluid in the inflator is pressurized by the ignition of the combustible sheet member. At about 40 milliseconds after ignition, the pressure in the ballistic test chamber has risen to about 27 psi. At 100 milliseconds after ignition, the pressure in the ballistic test chamber is still rising and has not reached 49 psi.

Accordingly, it can be seen that the presence of the oxygen in the inflation fluid supports the combustion of the combustible sheet member and thus can substantially decrease the time period needed to reach peak pressure. The addition of the oxygen also substantially increases the peak pressure which is attained. As a result, higher fluid pressures and flow rates are available to inflate an inflatable restraint, such as the air bag 14, if desired. Further, a substantially lower amount of the combustible sheet member is needed, thus decreasing the amount of combustion byproducts.

A rapid deflagration cord indicated schematically at 140 (FIG. 2) is optionally associated with the combustible sheet member 100. The rapid deflagration cord 140 extends through the central passage 126 of the combustible sheet member 100. The rapid deflagration cord 140 comprises a pyrotechnic material sheathed in tin and, when ignited by the squib 74, can help to ignite the combustible sheet member 100 more rapidly. A rapid deflagration member such as the cord 140 can optionally be associated, in a similar manner, with the combustible sheet members in air bag inflators which are constructed in accordance with the other embodiments of the invention discussed below.

Second Embodiment

In a second embodiment of the invention, the inflation fluid in the chamber 18 in the container 16 (FIG. 1) includes only an inert gas, such as argon, and does not include oxygen. The combustible sheet member 100, when ignited by the igniter 70, heats and pressurizes the inert gas in the chamber 18. When the pressure in the chamber 18 reaches a predetermined pressure, the burst disk 42 ruptures to enable inflation of the air bag 14 in the manner described above with reference to the first embodiment of the invention.

Third Embodiment

Figure 5:
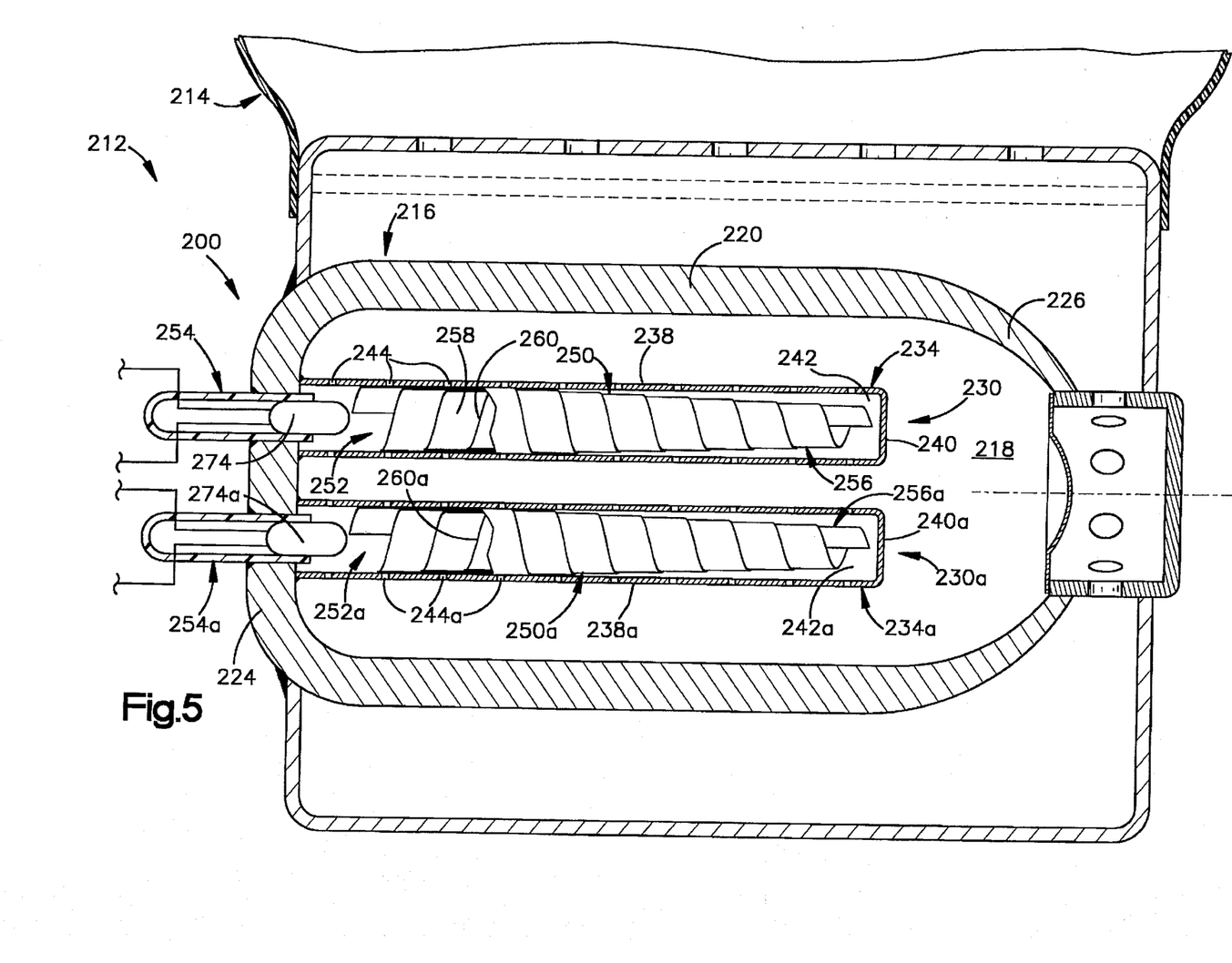
FIG. 5 is a schematic illustration partially in section of a vehicle safety apparatus including an air bag inflator which is constructed in accordance with a third and a fourth embodiment of the present invention.

FIG. 5 illustrates an air bag inflator 200 which is constructed in accordance with a third embodiment of the present invention. The inflator 200 forms a part of a vehicle safety apparatus 212 which is generally similar to the vehicle safety apparatus 12.

The inflator 200 (FIG. 5) includes two separately actuatable heating assemblies 230 and 230a. As illustrated, the heating assemblies 230 and 230a are identical to each other. Parts of the second heating assembly 230a which are the same as parts of the first heating assembly 230 are, therefore, given the same reference numeral with the suffix "a" added. It should be understood that plural heating assemblies could be provided which are different from each other in size or configuration or heating capacity.

The first heating assembly 230 includes a perforated steel tube 234 which is connected with an end wall 224 of a container 216. The perforated tube 234 is disposed inside a storage chamber 218 in the container 216. The perforated tube 234 extends axially from the first end wall 224 of the container 216 in a direction toward a second end wall 226 of the container.

The perforated tube 234 includes an axially extending, cylindrical side wall 238 and a radially extending end wall 240. The side wall 238 and the end wall 240 of the perforated tube 234 define a combustion chamber 242 inside the tube. A plurality of perforations or openings 244 in the side wall 238 of the perforated tube 234 establish fluid communication between the combustion chamber 242 inside the tube, and the portion of the storage chamber 218 which is disposed outside of the tube.

A combustible sheet member 250 is disposed inside the combustion chamber in the perforated tube 234. The combustible sheet member 250 is the same as the combustible sheet member 100 (FIGS. 1–3). The combustible sheet member 250 extends axially within the perforated tube 234. A first end portion 252 of the combustible sheet member 250 is disposed adjacent to an igniter 254. A second end portion 256 of the combustible sheet member 250 is disposed adjacent to the end wall 240 of the perforated tube 234. The combustible sheet member 250 is rolled up in a funnel shape inside the perforated tube 234. The combustible sheet member 250 has a generally conical configuration with a larger diameter at the first end portion 252 of the combustible sheet member 250 and a smaller diameter at the second end portion 256.

The generally conical configuration of the rolled combustible sheet member 250 defines a generally conical central passage 258 in the combustible sheet member 250. An inner edge surface 260 of the combustible sheet member 250 extends along the outer periphery of the central passage 258 from between the end portions 252 and 256. The edge surface 260 is presented toward the igniter 254 and is exposed to the igniter.

Each of the heating assemblies 230 and 230a is connected with vehicle electric circuitry (not shown), which is similar to the vehicle electric circuitry shown in FIG. 1, in a manner such that the heating assemblies are separately and independently actuatable. Thus, one or the other, or both, of the heating assemblies 230 and 230a can be actuated to heat the inflation fluid stored in the chamber 218 at a desired rate and for a desired period of time. If a faster rate of heating of the inflation fluid stored in the chamber 218 is desired, both heating assemblies 230 and 230a can be actuated at the same time. Alternatively, if a longer period of time of heating of the inflation fluid stored in the chamber 218 is desired, the heating assemblies 230 and 230a can be actuated sequentially one after the other using various amounts of time delay. Heating assemblies 230 and 230a can be provided which have different heating capacities from each other, and may include a rapid deflagration cord for supporting ignition.

In the third embodiment of the invention, as illustrated in FIG. 5, the inflation fluid in the chamber 218 in the container 216 includes an inert gas, such as argon, and also includes oxygen. The oxygen supports the combustion of the combustible sheet members 250 and 250a, in the manner described above with reference to the first embodiment of the invention. The combustible sheet members 250 and 250a, when ignited, heat and pressurize the inflation fluid in the chamber 218. When the pressure in the chamber 218 reaches a predetermined pressure, the burst disk ruptures to enable inflation of the air bag 214 in the manner described above with reference to the first embodiment of the invention.

Fourth Embodiment

In a fourth embodiment of the invention, the inflation fluid in the chamber 218 in the container 216 (FIG. 5) includes only an inert gas, such as argon, and does not include oxygen. The combustible sheet members 250 and 250a, when ignited, heat and pressurize the inert gas in the chamber 218. When the pressure in the chamber 218 reaches a predetermined pressure, the burst disk 242 ruptures to enable inflation of the air bag 214 in the manner described above with reference to the third embodiment of the invention.

Fifth Embodiment

Figure 6:
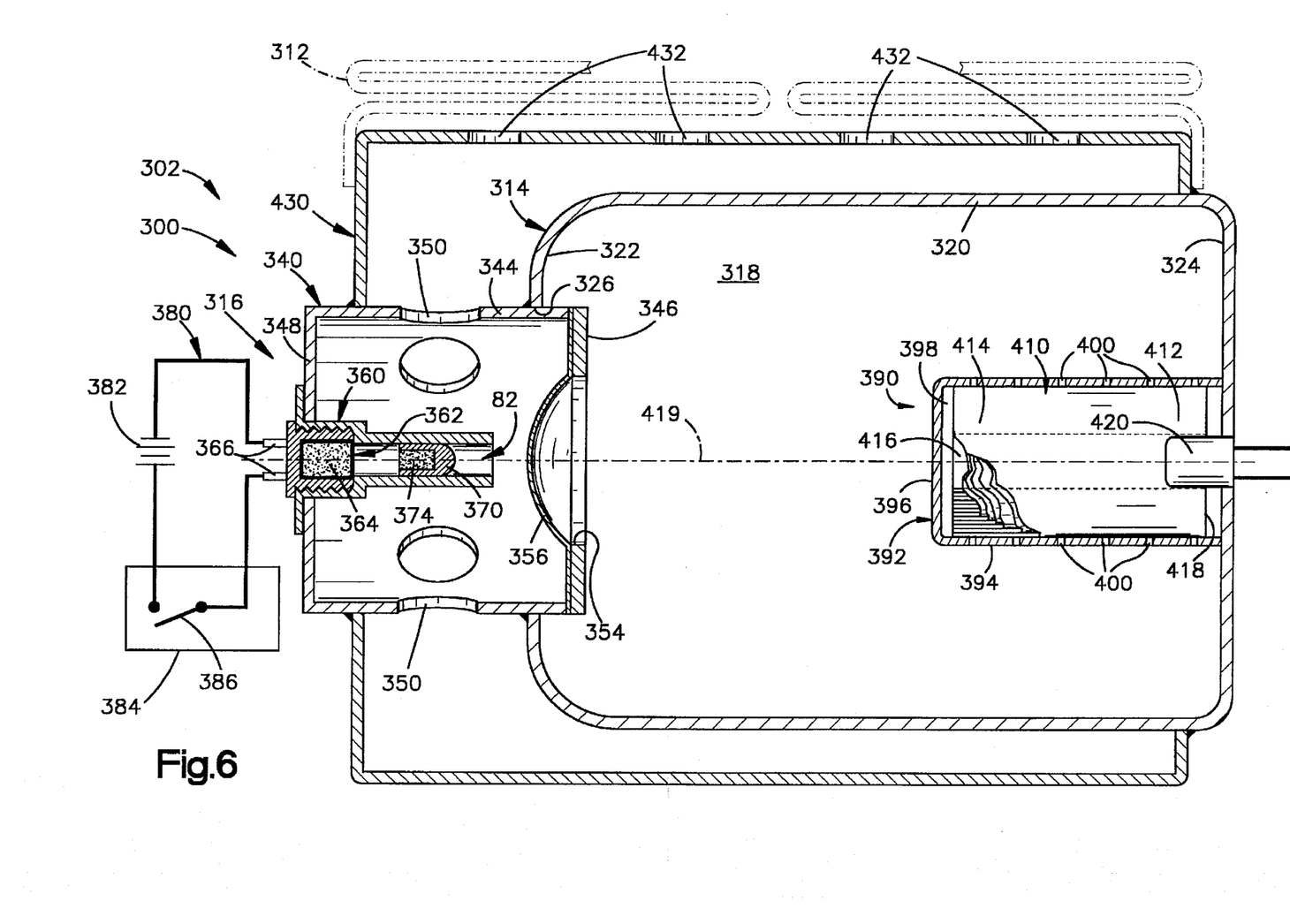
FIG. 6 is a schematic illustration partially in section of a vehicle safety apparatus including an air bag inflator which is constructed in accordance with a fifth embodiment of the present invention.

FIG. 6 illustrates schematically an air bag inflator 300 which is constructed in accordance with a fifth embodiment of the present invention. The inflator 300 forms a part of a vehicle occupant safety apparatus 302. The safety apparatus 302 includes an air bag 312 which is inflatable from a deflated, folded condition to an inflated condition to help protect a vehicle occupant.

The safety apparatus 300 includes a container 314 which has a sealed storage chamber 318 containing inflation fluid for inflating the air bag 312. The container 314 has a cylindrical side wall portion 320, a first end wall portion 322 and a second end wall portion 324. An opening 326 centered on the axis 419 of the inflator 300 extends through the first end wall portion 322.

The chamber 318 in the container 314 contains an inflation fluid which comprises a combustible mixture of gases for inflating the air bag 312. The combustible mixture of gases in the storage chamber 318 includes a fuel gas, an oxidizer gas for supporting combustion of the fuel gas, and an inert gas. The inert gas is preferably nitrogen, argon or a mixture of nitrogen and argon. The oxidizer gas is preferably oxygen and may be oxygen in air. The fuel gas may be hydrogen, methane, or a mixture of hydrogen and methane. Suitable mixtures of gases are known in the art.

A first portion of the oxygen in the mixture of gases in the chamber 318 supports the combustion of the fuel gas. A second portion of the oxygen in the mixture of gases in the chamber 318 supports the combustion of a combustible sheet member 410 as described below. The second portion of the oxygen may include more oxygen than is necessary to support the combustion of the combustible sheet member 410. The mixture of gases in the chamber 318 is preferably under pressure of 1,000 to 3,000 psi.

The safety apparatus 302 includes an actuating assembly 316 for opening the container 314. The actuating assembly 316 includes a manifold 340. The manifold 340 has a cylindrical side wall 344, a first end wall 346 and a second end wall 348. The side wall 344 of the manifold 340 is secured in the opening 326 in the first end wall portion 322 of the storage container 314.

The side wall 344 of the manifold 340 includes a circumferentially extending array of inflation fluid flow openings 350. The first end wall 346 of the manifold 340 has a circular inflation fluid exit opening 354. The inflation fluid exit opening 354 is closed by a metal burst disk 356. The burst disk 356 is supported in the manifold 340 between the inflation fluid exit opening 354 and the inflation fluid flow openings 350. The burst disk 356 blocks the flow of inflation fluid from the storage chamber 318 through the inflation fluid exit opening 354.

A cylindrical actuator housing 360 also is supported in the manifold 340. A squib 362 is supported within the actuator housing 360. The squib 362 contains a pyrotechnic charge 364 which is ignitable upon the passage of electric current between conductor pins 366. The pyrotechnic charge 364 is preferably $ZrKClO_4$, but other known pyrotechnic charge materials can be used.

The actuating assembly 316 further includes a movable container 370. An ignitable material 374 is contained within the container 370. The ignitable material 374 fills the container 370 and has an exposed surface extending across an open end (to the left as viewed in FIG. 6) of the container. The ignitable material 374 is preferably $BKNO_3$, but other known ignitable materials can be used as alternatives. The ignitable material 374 preferably is protected from environmental conditions such as moisture by a cap or a cover in the nature of a shell or possibly a wax coating (none of which are shown). When the inflator 300 is in the unactuated condition shown in FIG. 6, the movable container 370 is located within the actuator housing 360, as shown in FIG. 6. The cylindrical outer side surface of the movable container 370 is closely received against the cylindrical inner surface of the actuator housing 360 with a releasable interference fit. The exposed surface of the ignitable material 374 is presented toward the squib 362.

The actuating assembly 316 further includes an electric circuit 380. The electric circuit 380 includes a power source 382, which is preferably the vehicle battery, and a deceleration sensor 384 including a normally open switch 386. The electric circuit 380 extends through the squib 362 between the conductor pins 366.

The inflator 300 includes a heating assembly 390. The heating assembly 390 includes a perforated steel tube 392 which is affixed to the second end wall 324 of the container 314. The perforated tube 392 is disposed inside the storage chamber 318 in the container 314. The perforated tube 392 extends axially away from the second end wall 324 of the container 314 in a direction toward the first end wall 322 of the container.

The perforated tube 392 includes an axially extending, cylindrical side wall 394 and a radially extending end wall 396. The side wall 394 of the perforated tube 392 extends parallel to the axis 419 of the inflator 300. The side wall 394 and the end wall 396 of the perforated tube 392 define a combustion chamber 398 inside the tube. A plurality of perforations or openings 400 in the side wall 394 of the tube 390 establish fluid communication between the combustion chamber 398 inside the tube and the portion of the storage chamber 318 which is disposed outside of the tube.

A combustible sheet member 410 is disposed inside the combustion chamber 398 in the perforated tube 392. The combustible sheet member 410 is rolled in a different manner than the combustible sheet member 100 (FIGS. 1–3) but is otherwise the same as the combustible sheet member 100. Specifically, the combustible sheet member 410 is rolled up in a cylindrical shape (like a jelly roll) inside the perforated tube 392 and extends axially within the perforated tube 392. A first end portion 412 of the combustible sheet member 410 is disposed adjacent to the second end wall 324 of the container 314. A second end portion 414 of the combustible sheet member 410 is disposed adjacent to the end wall 396 of the perforated tube 392.

The combustible sheet member 410 when thus rolled has a central passage 416. An edge surface 418 of the rolled combustible sheet member 410 extends generally perpendicular to the axis 419 at a location adjacent to the inflation fluid exit opening 354. The edge surface 418 is presented toward the second end wall 324 of the container 314.

A known igniter 420 is secured to the second end wall 324 of the container 314. The igniter 420 is connected to the vehicle electric circuitry in a manner such that the igniters 360 and 420 are separately and independently actuatable.

In the event of a vehicle emergency situation such as a collision for which inflation of the air bag 312 is desired, the switch 386 in the deceleration sensor 384 closes. Electric current passes through the squib 362 between the conductor pins 366. The pyrotechnic charge 364 in the squib 362 is ignited, and produces hot combustion products. The combustion products from the squib 362 move axially into engagement with the movable container 370. When the combustion products from the squib 362 reach the movable container 370, they ignite the ignitable material 374 in the movable container 370. The ignitable material 374 then produces combustion products which are emitted from the open end of the movable container 370.

When the increasing pressure from the combustion products of the squib 362 and of the ignitable material 374 reaches a predetermined elevated level, the pressure acting against the movable container 370 becomes great enough to overcome the interference fit which holds the container 370 in the actuator housing. The pressure then moves the movable container 370 from its unactuated position and out of the actuator housing 360 toward the burst disk 356.

The movable container 370 is moved out of the actuator housing 360 forcefully enough to puncture a hole (not shown) through the burst disk 356. The movable container 370 thus opens the container 314 to release the inflation fluid from the storage chamber 318. The inflation fluid then flows out of the storage chamber 318 through the inflation fluid exit opening 354 and further through the manifold 340 to the inflation fluid flow openings 350. A diffuser 430 with a plurality of inflation fluid outlet openings 432 then directs the inflation fluid to flow from the manifold 340 to the air bag 312.

The movable container 370, after passing through the burst disk 356, enters the chamber 318. The container 370 may strike the end wall 396 of the perforated tube 392. The end wall 396 of the perforated tube 392 is strong enough to withstand the force of the moving container 370.

The movable container 370 carries the ignitable material 374 into the chamber 318 in which the inflation fluid is stored. The combustion products generated by the ignitable material 374 continue to be emitted from the movable container 370 as the container moves through the chamber 318. The ignitable material 374 ignites the fuel gas portion of the inflation fluid flowing into the manifold 340. The burning of the fuel gas generates heat and products of combustion which increase the temperature and pressure of the inflation fluid flowing through the manifold 340. The fuel gas is consumed before it reaches the inflation fluid outlet openings 432 in the diffuser 430.

The vehicle electric circuitry also actuates the second igniter 420, at a selected time, to ignite the combustible sheet member 410. When the combustible sheet member 410 burns, it generates hot combustion products which increase the temperature and pressure of the inflation fluid in the storage chamber 318. The combustible sheet member 410 thus increases the pressure of the inflation fluid flowing out of the chamber 318 through the inflation fluid exit opening 354 and into the air bag 312.

The igniter 420 can be actuated to ignite the combustible sheet member 410 to heat the inflation fluid stored in the chamber 318 at a desired rate and for a desired period of time. If a faster rate of heating of the inflation fluid stored in the chamber 318 is desired, both igniters 360 and 420 can be actuated at the same time. Alternatively, if a longer period of time of heating of the inflation fluid stored in the chamber 318 is desired, the igniter 420 can be actuated after the igniter 360.

It should be understood that a combustible sheet member having a funnel-shaped configuration as illustrated in FIGS. 1–3 can be incorporated in the air bag inflator 300 (FIG. 6). The cylindrical roll configuration illustrated in FIG. 6, however, allows more combustible sheet member to be placed in the same volume of space. Thus, more total heat output can generally be obtained from a cylindrically rolled combustible sheet member, in the same size perforated tube, than with, for example, the funnel-shaped configuration illustrated in FIGS. 1–3.

Sixth Embodiment

Figure 7:
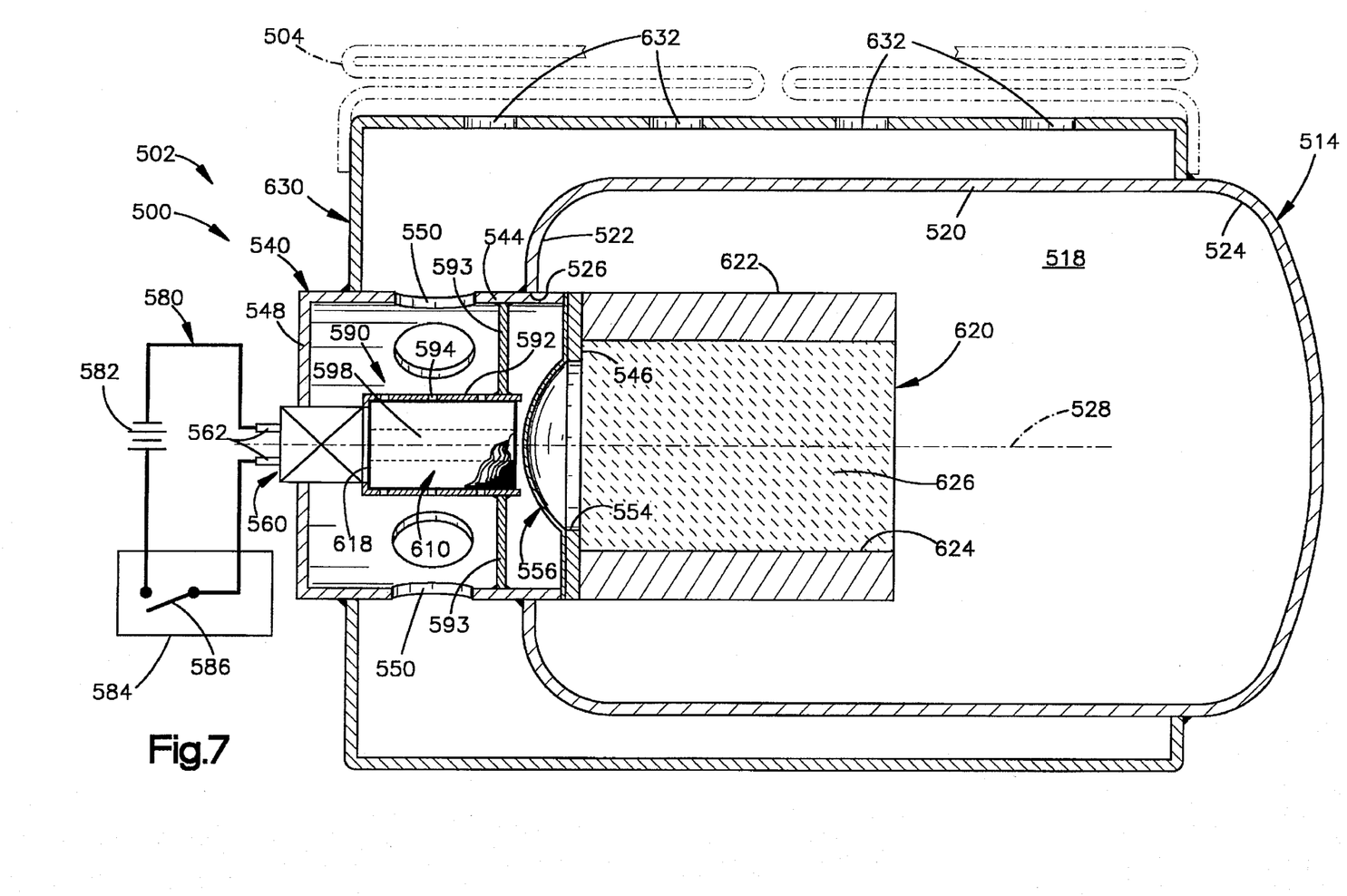
FIG. 7 is a schematic illustration partially in section of a vehicle safety apparatus including an air bag inflator which is constructed in accordance with a sixth embodiment of the present invention.

FIG. 7 illustrates schematically an air bag inflator 500 which is constructed in accordance with a sixth embodiment of the present invention. The inflator 500 forms a part of a vehicle occupant safety apparatus 502. The safety apparatus 502 is similar to the safety apparatus 302 (FIG. 6) and includes an air bag 504 which is inflatable from a deflated, folded condition to an inflated condition to help to protect a vehicle occupant.

The inflator 500 includes a storage container 514. The storage container 514 has a sealed storage chamber 518 containing an inflation fluid which comprises a combustible mixture of gases for inflating the air bag 504. The combustible mixture of gases in the storage chamber 518 includes a fuel gas, an oxidizer gas for supporting combustion of the fuel gas, and an inert gas. The inert gas is preferably nitrogen, argon or a mixture of nitrogen and argon. The oxidizer gas is preferably oxygen and may be oxygen in air. The fuel gas may be hydrogen, methane, or a mixture of hydrogen and methane. Suitable mixtures of gases are known in the art.

The inflation fluid in the chamber 518 includes more oxygen than is necessary to support the combustion of the fuel gas. The excess oxygen is used to support the combustion of a combustible sheet member 610 as described below. The mixture of gases in the chamber 518 is preferably under pressure of 1,000 to 3,000 psi.

The container 514 has a cylindrical side wall portion 520, a first end wall portion 522 and a second end wall portion 524. An annular opening 526 centered on an axis 528 of the inflator 500 extends through the first end wall portion 522 of the container 514. A manifold 540 has a cylindrical side wall 544 which extends through the opening 526 in the first end wall portion 522 of the container 514. The manifold 540 also has a first end wall 546 and a second end wall 548. The side wall 544 of the manifold 540 includes a circumferential array of inflation fluid flow openings 550. The first end wall 546 of the manifold 540 has a circular inflation fluid exit opening 554.

The inflation fluid exit opening 554 in the manifold 540 is closed by a metal burst disk 556. The burst disk 556 is supported in the manifold 540 between the inflation fluid exit opening 554 and the inflation fluid flow openings 550. When the temperature of the burst disk 556 is below a first predetermined temperature, the burst disk is in a first condition as illustrated in FIG. 7. The first predetermined temperature is a temperature which is substantially higher than any temperature normally experienced by the burst disk 556 other than upon actuation of the inflator 500. When the burst disk 556 is in the first condition, the burst disk has a first burst strength which is sufficient to prevent rupturing of the burst disk under the pressure of the inflation fluid stored in the chamber 518.

An igniter indicated schematically at 560 is supported in the manifold 540. The igniter 560 may include a pyrotechnic charge which generates hot combustion products when ignited. The igniter 560 is ignitable upon the passage of an electric current through conductor pins 562. An electric circuit 580 associated with the igniter 560 includes a power source 582, which is preferably the vehicle battery, and a deceleration sensor 584 including a normally open switch 586. The electric circuit 580 extends through the conductor pins 562, for actuation of the igniter 560 when the switch 586 is closed.

The inflator 500 includes a heating assembly 590. The heating assembly 590 includes a perforated steel tube 592 which is disposed inside the manifold 540. A "spider" 593 supports the perforated tube 592 at a location between the igniter 560 and the burst disk 556. The perforated tube 592 includes a plurality of perforations or openings 594 which establish fluid communication between the inside and the outside of the tube.

A combustible sheet member 610 is disposed inside a combustion chamber 598 in the perforated tube 592. The combustible sheet member 610 is rolled in a cylindrical configuration like the combustible sheet member 410 (FIG. 6). The combustible sheet member 610 when thus rolled has a radially extending edge surface 618 which extends generally perpendicular to the axis 528 at a location adjacent to the igniter 560. The edge surface 618 of the combustible sheet member 610 is presented toward the igniter 560.

The inflator 500 further includes a combustion arrestor 620. The combustion arrestor 620 is located in the chamber 518 in the container 514 and is secured, in a manner not shown, to the end wall 546 of the manifold 540. The combustion arrestor 620 overlies the burst disk 556. The combustion arrestor 620 includes a cylindrical housing 622 which is preferably made from stainless steel and which defines a cylindrical chamber 624 in the housing. A combustion barrier material 626 is disposed in the chamber 624. The barrier material 626 is porous or has spaced gaps making it permeable to the mixture of gases in the container 518. The barrier material 626 may, for example, be a mass of preferably stainless steel wool or stainless steel mesh helically wound, layer upon layer, as in known combustion arrestors used in welding torches.

In the event of a vehicle emergency situation such as a collision for which inflation of the air bag 504 is desired, the switch 586 closes. Electric current passes through the conductor pins 562 of the igniter 560. The igniter 560 is actuated and produces hot combustion products which ignite the combustible sheet member 610.

When the combustible sheet member 610 burns, it heats the burst disk 556. The burst disk 556 is heated to a second predetermined temperature which is substantially greater than the first predetermined temperature. The burst disk is then in a second condition (not shown) and has a second burst strength which is less than the first burst strength. When the burst disk 556 is in the second condition, the burst disk is weakened sufficiently that it ruptures under the pressure of the stored inflation fluid in the chamber 518.

The pressurized inflation fluid in the chamber 518 then rushes outward through the combustion arrestor 620 and through the inflation fluid exit opening 554. The inflation fluid flows past the ruptured burst disk 556 and into the manifold 540. The burning combustible sheet member 610 ignites the fuel gas portion of the inflation fluid flowing into the manifold 540. The burning of the fuel gas generates heat and products of combustion which increase the temperature and pressure of the inflation fluid in the manifold 540. The combustible sheet member 610 thus increases the pressure of the inflation fluid flowing out of the chamber 518 through the manifold 540.

The heated and pressurized inflation fluid then flows rapidly outward through the inflation fluid flow openings 550 in the manifold 540. A diffuser 630 with a plurality of inflation fluid outlet openings 632 directs the inflation fluid to flow from the manifold 540 to the air bag 504. The fuel gas is consumed before it reaches the inflation fluid outlet openings 632 in the diffuser 630. The combustion products of the burning fuel gas are prevented from propagating into the chamber 518 by the barrier material 626 of the combustion arrestor 620, and by the outward gas flow through the barrier material.

It should be understood that a combustible sheet member having a funnel-shaped configuration as illustrated in FIGS. 1–3 can be incorporated in the air bag inflator 500 in place of the cylindrical rolled member 610.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant restraint, said apparatus comprising:

a container having a chamber;

a quantity of inflation fluid stored in said chamber;

combustible means for warming and increasing the pressure of said stored inflation fluid, said combustible means including a combustible sheet member disposed in said chamber;

said combustible sheet member comprising a substrate of oxidizing film and a layer of oxidizable fuel material on at least a portion of one surface of said film, said substrate and said fuel material being capable of reacting together exothermically on ignition;

first igniter means for igniting said combustible sheet member; and directing means for directing said inflation fluid from said container to the inflatable restraint;

said inflation fluid comprising oxygen for supporting the combustion of said combustible sheet member.

2. An apparatus as set forth in claim 1 wherein said inflation fluid comprises from about 5% to about 20% by volume of said oxygen.

3. An apparatus as set forth in claim 2 wherein said inflation fluid comprises from about 80% to about 95% by volume of an inert gas, such as argon or nitrogen or a mixture of argon and nitrogen.

4. An apparatus as set forth in claim 1 wherein said inflation fluid comprises a combustible fuel gas, said oxygen in said inflation fluid comprising a first portion of said oxygen which is sufficient to support the combustion of said combustible fuel gas and a second portion of said oxygen for supporting the combustion of said combustible sheet member.

5. An apparatus as set forth in claim 4 comprising second igniter means for igniting said combustible fuel gas, said second igniter means being separately and independently actuatable from said first igniter means.

6. An apparatus for inflating an inflatable vehicle occupant restraint, said apparatus comprising:

a container having a chamber;

a quantity of inflation fluid stored in said chamber;

directing means for directing said inflation fluid from said container to the inflatable restraint;

a first perforated tube extending within said stored inflation fluid in said chamber;

a first combustible sheet member rolled up and disposed in said first perforated tube in said chamber;

a second perforated tube extending within said stored inflation fluid in said chamber;

a second combustible sheet member rolled up and disposed in said second perforated tube in said chamber;

first igniter means for selectively igniting said first combustible sheet member independently of said second combustible sheet member; and second igniter means for selectively igniting said second combustible sheet member independently of said first combustible sheet member;

each one of said first and second combustible sheet members comprising a substrate of oxidizing film having a layer of oxidizable fuel material on at least a portion of one surface of said film, said substrate and said fuel material being capable of reacting together exothermically on ignition.

7. An apparatus as set forth in claim 6 wherein said inflation fluid comprises from about 5% to about 20% by volume of oxygen for supporting the combustion of said combustible sheet members.

8. An apparatus as set forth in claim 6 further comprising a pair of rapid deflagration members associated with said combustible sheet members, said rapid deflagration members being ignitable by said igniter means to help to ignite said combustible sheet members.

9. An apparatus for inflating an inflatable vehicle occupant restraint, said apparatus comprising:

a container having a chamber;

a quantity of inflation fluid stored in said chamber;

combustible means for warming and increasing the pressure of said stored inflation fluid, said combustible means including a combustible sheet member disposed in said chamber;

said combustible sheet member comprising a substrate of oxidizing film and a layer of oxidizable fuel material on at least a portion of one surface of said film, said substrate and said fuel material being capable of reacting together exothermically on ignition;

first igniter means for igniting said combustible sheet member;

directing means for directing said inflation fluid from said container to the inflatable restraint;

said inflation fluid comprising oxygen for supporting the combustion of said combustible sheet member; and a rapid deflagration member associated with said combustible sheet member, said rapid deflagration member being ignitable by said first igniter means to help to ignite said combustible sheet member;

said combustible sheet member having a central passage, said rapid deflagration member comprising a cord which extends through at least a portion of said central passage of said combustible sheet member.

10. An apparatus as set forth in claim 9 wherein said rapid deflagration member comprises a pyrotechnic material sheathed in tin.

11. An apparatus for inflating an inflatable vehicle occupant restraint, said apparatus comprising:

a container having a chamber;

a quantity of inflation fluid stored in said chamber;

combustible means for warming and increasing the pressure of said stored inflation fluid, said combustible means including a combustible sheet member disposed in said chamber;

said combustible sheet member comprising a substrate of oxidizing film and a layer of oxidizable fuel material on at least a portion of one surface of said film, said substrate and said fuel material being capable of reacting together exothermically on ignition;

first igniter means for igniting said combustible sheet member;

directing means for directing said inflation fluid from said container to the inflatable restraint;

said inflation fluid comprising oxygen for supporting the combustion of said combustible sheet member;

said inflation fluid comprising a combustible fuel gas, said oxygen in said inflation fluid comprising a first portion of said oxygen which is sufficient to support the combustion of said combustible fuel gas and a second portion of said oxygen for supporting the combustion of said combustible sheet member; and a rapid deflagration member associated with said combustible sheet member, said rapid deflagration member comprising a pyrotechnic material sheathed in tin and being ignitable by said first igniter means to help to ignite said combustible sheet member.

12. An apparatus for inflating an inflatable vehicle occupant restraint, said apparatus comprising:

a container having a chamber;

a quantity of inflation fluid stored in said chamber;

directing means for directing said inflation fluid from said container to the inflatable restraint;

a first perforated tube extending within said stored inflation fluid in said chamber;

a first combustible sheet member rolled up and disposed in said first perforated tube in said chamber;

a second perforated tube extending within said stored inflation fluid in said chamber;

a second combustible sheet member rolled up and disposed in said second perforated tube in said chamber;

first igniter means for selectively igniting said first combustible sheet member independently of said second combustible sheet member; and second igniter means for selectively igniting said second combustible sheet member independently of said first combustible sheet member;

each one of said first and second combustible sheet members comprising a substrate of oxidizing film having a layer of oxidizable fuel material on at least a portion of one surface of said film, said substrate and said fuel material being capable of reacting together exothermically on ignition;

each one of said first and second combustible sheet members having a first end portion disposed adjacent to said igniter means and a second end portion disposed farther from said igniter means than said first end portion, each one of said first and second combustible sheet members comprising a strip of sheet material rolled up in a series of turns into a conical configuration and having a central passage which has a generally conical configuration, said central passages having relatively large diameters at said first end portions of said combustible sheet members and relatively small diameters at said second end portions of said combustible sheet members, each one of said strips of sheet material having an edge surface extending along the entire length of said strip of sheet material between said first end portion and said second end portion, each one of said edge surfaces of said strips of sheet material being exposed to said igniter means along substantially the entire length of said combustible sheet members.

13. An apparatus for inflating an inflatable vehicle occupant restraint, said apparatus comprising:

a container having a chamber;

a quantity of inflation fluid stored in said chamber;

combustible means for warming and increasing the pressure of said stored inflation fluid, said combustible means including a combustible sheet member;

a perforated tube extending within said inflation fluid in said chamber and having a plurality of radial openings, said combustible member being disposed in said perforated tube;

said combustible sheet member comprising a substrate of oxidizing film and a layer of oxidizable fuel material on at least a portion of one surface of said film, said substrate and said fuel material being capable of reacting together exothermically inside said perforated tube on ignition to produce hot combustion products which flow outward through said plurality of radial openings in said perforated tube into said chamber;

first igniter means for igniting said combustible sheet member; and directing means for directing said inflation fluid from said container to the inflatable restraint;

said inflation fluid comprising oxygen for supporting the combustion of said combustible sheet member.

14. An apparatus as set forth in claim 13 wherein said inflation fluid comprises from about 5% to about 20% by volume of said oxygen.

15. An apparatus as set forth in claim 14 wherein said inflation fluid comprises from about 80% to about 95% by volume of an inert gas, such as argon or nitrogen or a mixture of argon and nitrogen.

16. An apparatus as set forth in claim 13 wherein said inflation fluid comprises a combustible fuel gas, said oxygen in said inflation fluid comprising a first portion of said oxygen which is sufficient to support the combustion of said combustible fuel gas in said chamber and a second portion of said oxygen for supporting the combustion of said combustible sheet member inside said perforated tube in said chamber.

* * * * *